Oct. 27, 1936.  N. M. H. BLUMENKRANZ ET AL  2,058,765
SLICING DEVICE FOR VEGETABLES AND THE LIKE
Filed May 20, 1935  2 Sheets-Sheet 1
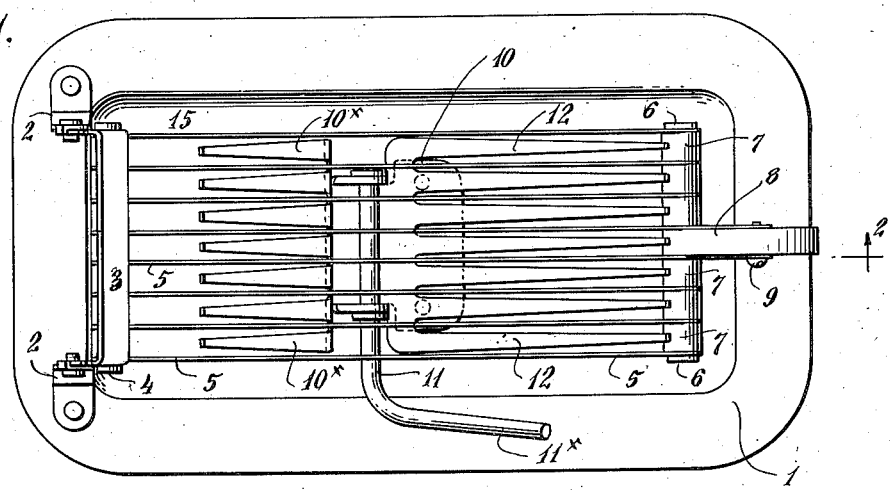
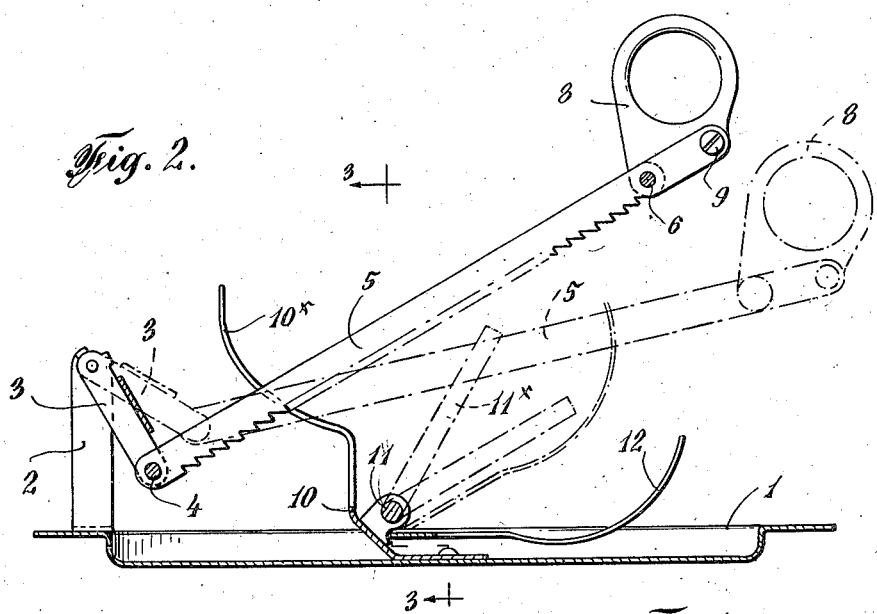
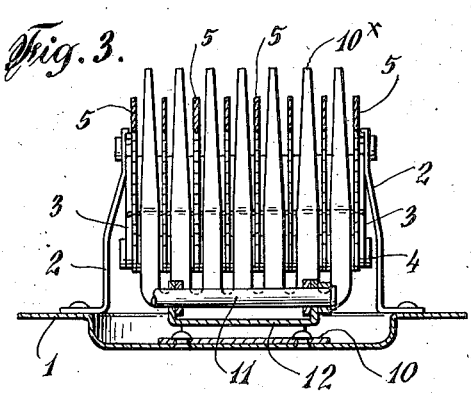
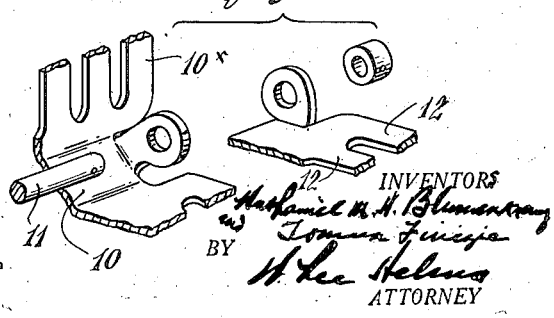

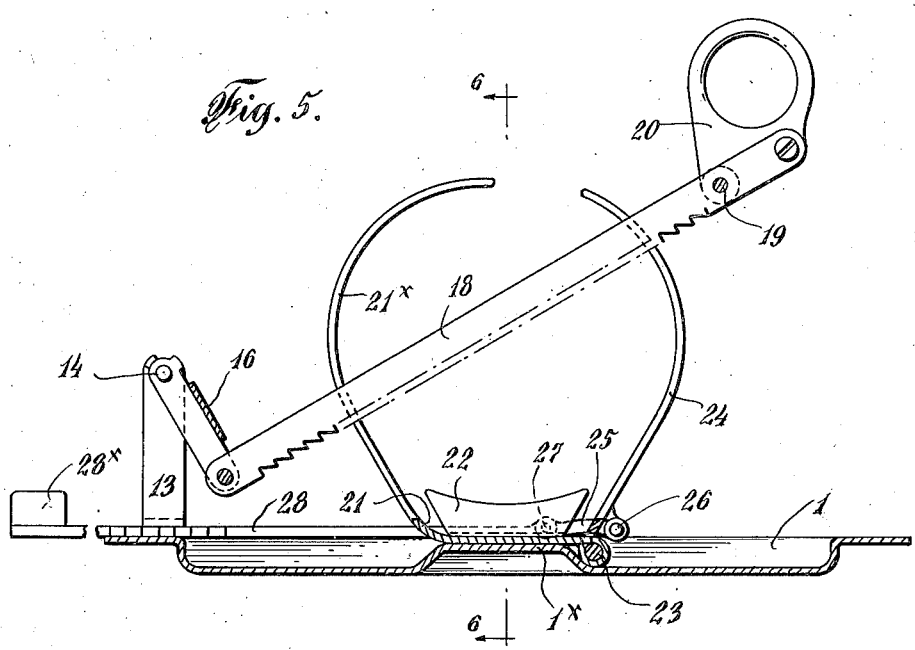
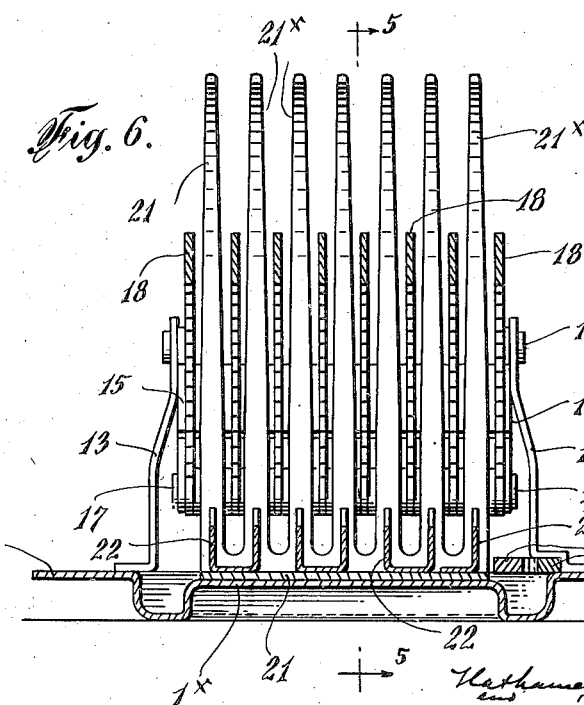

Patented Oct. 27, 1936

2,058,765

UNITED STATES PATENT OFFICE 2,058,765

SLICING DEVICE FOR VEGETABLES AND THE LIKE

Nathaniel M. H. Blumenkranz and Tomun Finizie, Peekskill, N. Y.

Application May 20, 1935, Serial No. 22,342

1 Claim. (Cl. 146—138)

The object of the present invention is to provide an apparatus for slicing, particularly adapted for fruits or vegetables difficult to slice, as, for example, tomatoes which have a thin tough skin and a soft, easily disrupted fluid-containing interior. The device also is adapted for general slicing purposes.

A characteristic of the device is the provision of a plurality of cutting blades adapted for reciprocal and bodily downward movement, in combination with means for holding the object to be sliced, as, for example, a fruit or a vegetable, in such manner that a fragile object may be properly held in relation to the cutting blades to insure effective action of the latter. Thus, in the case of tomatoes, applicant has failed to find in the art a slicing apparatus which is commercially practical. The problem is a difficult one since in the combined action of five or more cutting blades there is a substantial compressive action tending to disrupt the tomato before the slicing can be completed, the present apparatus overcoming this difficulty.

The invention will be described with reference to the accompanying drawings, in which Fig. 1 is a plan view of an embodiment of the invention.

Fig. 2 is a sectional elevation on the line 2—2, Fig. 1, showing in dotted lines certain adjusted positions of the cutter blade structure and held for the object to be sliced.

Fig. 3 is a transverse section on the line 3—3, Fig. 2.

Fig. 4 is a fragmentary perspective view of certain of the holding elements in separated relation.

Fig. 5 is a view in sectional elevation of a modified form of the invention.

Fig. 6 is a transverse section on the line 6—6, Fig. 5.

In the embodiment of the invention illustrated in Figs. 1 to 4 inclusive, we have shown a tray 1 from which rises two bracket arms 2. Pivoted to the bracket arms is a yoke member 3 having spaced forwardly projecting arms which at their lower ends are apertured to receive a pivot rod 4.

Mounted upon rod 4 and separated by suitable spacer washers (not shown) are a plurality of cutter blades 5. At their opposite ends, cutter blades 5 are apertured and receive a connecting rod 6 and are suitably spaced on said rod by washers 7. The rods 4 and 6 at their outer ends will be headed in any suitable manner. Also mounted on rod 6 is an operating handle 8 and the blades at the opposite sides of handle 8 may be extended and secured to the handle by a screw 9 to aid in holding the handle in proper position.

Secured to the base of the tray, which may be counter-sunk, is a bracket 10 having a plurality of upwardly extending spaced fingers 10x, the cutter blades 5 lying between the fingers. The bracket is formed with spaced ears to receive a shaft 11 having an operating handle 11x.

Secured in fixed position upon shaft 11 are a plurality of spaced fingers 12, the fingers lying between the cutter blades 5.

When an article to be cut has been placed on fingers 10x, the operator may move handle 11x upwardly to carry fingers 12 into gripping relation with the article, whereupon handle 8 may be manipulated to give reciprocal motion to the blades, and, at the same time, carry them downwardly as the slicing progresses, until the serrated or toothed edges of the blades pass below the article in its upwardly held position.

In the construction shown in Figure 5, the tray 1 is provided with upwardly extending arms 13 which are apertured to receive a shaft 14. Pivotally mounted upon the shaft are two spaced links 15 which may be connected by a bar 16, thus providing a yoke. Arms 15 at their lower ends carry a shaft 17 and pivotally supported upon the shaft are a plurality of cutter blades 18 which may be held in spaced relationship by suitable spacer washers. The blades at their opposite ends are apertured to receive a shaft 19 similar to a shaft 6 in the structure of Figs. 1 to 4 inclusive, and a handle 20 is mounted in the same manner as handle 8.

The bottom wall of tray 1 is raised centrally thereof to provide a seat 1x and upon the seat is secured the lower horizontal section of a bracket 21 formed with a plurality of upwardly extending curved fingers 21x. Rising from said horizontal section of the bracket are a plurality of fixed supporting fins 22.

Carried by a pin 23 pivotally supported by bracket 21 are a plurality of curved spaced fingers 24 generally similar in form and arrangement to the spaced fingers 12 in the construction of Figs. 1 to 4 inclusive. The fingers 24 are connected at their base and to the fingers a link 25 is pivotally connected at 26, the link in turn being pivotally connected at 27 to a latch rod 28. The latch rod is laterally toothed to engage a toothed member 29 (Fig. 6) adjacent one of the arms 13. Latch rod 28 may be provided with a thumb piece 28x.

In the operation of the structure shown in Figs. 5 and 6, the article to be sliced is placed upon the fins 22 in abutment with fingers 21x. Thereupon latch rod 28 is moved outwardly, thus carrying fingers 24 upwardly and into firm holding relation to the object. The latch rod may then be given a slight lateral movement to cause its teeth to engage with toothed member 29. The object thus being firmly held, the handle 20 may be manipulated to reciprocate the cutter blades and also carry them downwardly in the cutting operation. In the cutting operation, a fragile article is supported by fingers 21x and 24 closely adjacent the lines of cut and there is adequate resistance to any disruption of the article through the pressure exerted thereon by the blades.

Having described our invention, what we claim and desire to secure by Letters Patent, is as follows:—

In a slicing apparatus a tray, a plurality of spaced cutter blades, short arms rigidly connected to the tray and extending vertically therefrom, a pair of links pivoted to said arms and a cross bar forming with said links a swinging bracket, pivotal connections between said bracket and the cutter blades supporting the latter for both reciprocal and bodily movement toward and from said tray, a lateral support for an object to be sliced comprising a metallic bracket-like base member secured to the tray formed with upwardly extending curved spaced members, the base member being formed with bearing members, a second lateral support for said object comprising a metallic base member pivoted to said bearing members and formed with upwardly extending spaced curved fingers, and means applied adjacent the pivotal point of said second support for causing a leverage force thereon to move the same toward the second support, said last-named means comprising a latch bar pivotally connected to said second support and extending in a horizontal plane substantially parallel with the base of the tray, said bar extending transversely of the said short vertical arms, and a complementary interlocking means carried by the bar and the tray adapted to be interengaged and disengaged.

NATHANIEL M. H. BLUMENKRANZ.
TOMUN FINIZIE.